US010710562B2

United States Patent
Masuda

(10) Patent No.: US 10,710,562 B2
(45) Date of Patent: Jul. 14, 2020

(54) ELECTRIC BRAKE SYSTEM AND ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/817,905

(22) Filed: Nov. 20, 2017

(65) Prior Publication Data

US 2018/0072289 A1 Mar. 15, 2018

Related U.S. Application Data

(63) Continuation of application No. PCT/JP2016/064871, filed on May 19, 2016.

(30) Foreign Application Priority Data

May 21, 2015 (JP) ................................ 2015-103491

(51) Int. Cl.
*B60T 8/1761* (2006.01)
*F16D 65/18* (2006.01)
(Continued)

(52) U.S. Cl.
CPC .............. *B60T 8/1761* (2013.01); *B60T 8/00* (2013.01); *B60T 8/17* (2013.01); *B60T 8/175* (2013.01);
(Continued)

(58) Field of Classification Search
CPC ...... B60T 8/1761; B60T 13/741; F16D 65/18; F16D 2121/24
See application file for complete search history.

(56) References Cited

U.S. PATENT DOCUMENTS 6,425,643 B2 *  7/2002  Shirai ..................... B60T 7/042
                                                    188/1.11 E
6,607,253 B1   8/2003  Yamamoto et al.
(Continued)

FOREIGN PATENT DOCUMENTS

CN          1509925         7/2004
CN        103889794         6/2014
(Continued)

OTHER PUBLICATIONS

Decision of Grant dated Aug. 30, 2016 in corresponding Japanese Patent Application No. 2015-103491.
(Continued)

*Primary Examiner* — Xuan Lan Nguyen

(57) ABSTRACT

A brake integrated control section generates, as target values, a target braking force and a target wheel speed equivalent value of each electric brake device, and transmits the target braking force and the target wheel speed equivalent value to a target value transmitter. An electric brake control device of each electric brake device includes a braking force controller that controls an electric motor in accordance with the target braking force, a wheel speed controller that controls the electric motor in accordance with the target wheel speed equivalent value, and a control switcher. The control switcher switches between use of the braking force controller and use of the wheel speed controller in accordance with a predetermined condition.

8 Claims, 9 Drawing Sheets

(51) Int. Cl.
    *B60T 8/176* (2006.01)
    *B60T 8/00* (2006.01)
    *B60T 8/175* (2006.01)
    *B60T 8/17* (2006.01)
    *B60T 13/74* (2006.01)
    *F16D 121/24* (2012.01)

(52) U.S. Cl.
    CPC .............. *B60T 8/176* (2013.01); *B60T 13/74* (2013.01); *B60T 13/741* (2013.01); *F16D 65/18* (2013.01); *F16D 2121/24* (2013.01)

(56) References Cited

U.S. PATENT DOCUMENTS

| | | | |
|---|---|---|---|
| 7,004,290 B2 | 2/2006 | Ohtsuki et al. | |
| 7,448,699 B2 | 11/2008 | Manaka | |
| 7,810,616 B2 | 10/2010 | Nakazeki | |
| 8,714,316 B2* | 5/2014 | Hori | B60T 13/741 188/72.2 |
| 8,958,966 B2* | 2/2015 | Nohira | B60T 8/885 701/70 |
| 9,150,203 B2 | 10/2015 | Watanabe | |
| 2004/0104619 A1 | 6/2004 | Manaka | |
| 2004/0164608 A1 | 8/2004 | Ohtsuki et al. | |
| 2007/0138861 A1* | 6/2007 | Kawahara | B60T 13/741 303/20 |
| 2008/0059023 A1* | 3/2008 | Ueno | B60T 1/10 701/36 |
| 2008/0110704 A1 | 5/2008 | Nakazeki | |
| 2011/0139555 A1 | 6/2011 | Hori | |
| 2014/0244128 A1 | 8/2014 | Watanabe | |
| 2015/0112565 A1* | 4/2015 | Yasui | B60T 8/171 701/70 |
| 2015/0224970 A1* | 8/2015 | Yasui | B60T 8/17616 701/74 |

FOREIGN PATENT DOCUMENTS

| | | |
|---|---|---|
| EP | 1 095 834 A2 | 5/2001 |
| JP | 6-327190 | 11/1994 |
| JP | 2003-104195 | 4/2003 |
| JP | 2003-287069 | 10/2003 |
| JP | 2004-255962 | 9/2004 |
| JP | 2006-194356 | 7/2006 |
| JP | 2007-15602 | 1/2007 |
| JP | 2007-30881 | 2/2007 |

OTHER PUBLICATIONS

International Search Report dated Jun. 21, 2016 in corresponding International Patent Application No. PCT/JP2016/064871.
Extended and Supplementary European Search Report dated Mar. 7, 2019 in corresponding European Patent Application No. 16796557.3 (10 pages).
English Language Translation of the International Preliminary Report on Patentability dated Nov. 30, 2017 in corresponding International Patent Application No. PCT/JP2016/064871.
Decision of Grant dated Mar. 26, 2019 in corresponding Japanese Patent Application No. 2016-181678 (3 pages).
Office Action dated Jun. 13, 2019 in related Chinese Patent Application No. 201680029186.0.
Office Action, dated Apr. 14, 2020, in corresponding Chinese Application No. 201680029186.0 (15 pp.).

* cited by examiner

ELECTRIC BRAKE SYSTEM AND ELECTRIC BRAKE DEVICE

CROSS REFERENCE TO THE RELATED APPLICATION

This application is a continuation application, under 35 U.S.C. § 111(a), of international application No. PCT/JP2016/064871, filed May 19, 2016, which is based on and claims Convention priority to Japanese patent application No. 2015-103491, filed May 21, 2015, the entire disclosure of which is herein incorporated by reference as a part of this application.

BACKGROUND OF THE INVENTION

Field of the Invention

The present invention relates to an electric brake system applied to a vehicle such as an automobile, and an electric brake device that forms this system.

Description of Related Art

Regarding an electric brake device, the following proposals have been made.

The proposal of an electric brake actuator for which an electric motor, a linear motion mechanism, and a speed reducer or reduction gear are used (Patent Document 1).

The proposal of an electric actuator for which a planetary roller mechanism and an electric motor are used (Patent Document 2).

RELATED DOCUMENT

Patent Document

[Patent Document 1] JP Laid-open Patent Publication No. H 06-327190
[Patent Document 2] JP Laid-open Patent Publication No. 2006-194356

In the electric brake systems for which an electric brake device is used as those described in Patent Documents 1 and 2, in general, a motor three-phase power line and various sensor signal lines have to be disposed between a control device and an electric brake actuator. A configuration with a long distance between these two components is disadvantageous in terms of the cost, weight, and durability.

For example, in general, an electric brake device needs to be controlled using a low-voltage system such as 12 V in a vehicle. The three-phase power line tends to be thick in order to satisfy the rated current, thus problems arise in terms of the cost and weight of the harness. Additionally, an increased length of the three-phase power line may result in an increase in a loss in the harness, making it difficult to achieve a high-speed brake control. Therefore, it is conceivable to adopt a configuration in which an electric brake control device is disposed for each brake in a distributed manner. In this case, a configuration in which outputs of a wheel speed sensor are processed by an electric brake control device seems to be preferable because the wiring of the wheel speed sensor is simplified.

For example, in an anti-lock operation using an ABS (anti-lock brake system), a braking force command to an electric brake actuator needs to be input at an extremely high speed. However, when a braking force command is transmitted at a high speed to all of the plurality of electric brake actuators, for example, in a CAN (controller area network) commonly used for the vehicle control system, the problem of a lack of the communication stability such as an excessively high network occupancy arises. To avoid this, there is the possibility that it becomes necessary to implement expensive and complex communication specifications such as a high-speed communication and an independent communication system. If a configuration in which the above-described wheel speed sensor output is processed by the electric brake control device is adopted, the wheel speed sensor signals of the four wheels have to be integrated, for example, in vehicle speed estimation or the like, so that a further strain may be placed on the frequency of transmission to the electric brake actuator.

SUMMARY OF THE INVENTION

It is an object of the present invention to provide an electric brake system and an electric brake device for which the wiring structure can be simplified and the power line can be reduced or shortened when performing a wheel speed control such as an anti-lock control and a braking force control different therefrom, which bring about an advantage in terms of cost, and the command communication period to the electric brake control device can be increased, thus making it possible to achieve a reduced cost and enhanced reliability for the communicator.

Hereinafter, in order to facilitate understanding of the present invention, the present invention will be described with reference to the reference numerals in embodiments for the sake of convenience.

An electric brake system according to the present invention includes: a plurality of electric brake devices 3 each including an electric brake actuator 4 that includes a brake rotor 15, a friction member 16, a friction member operator 13 that brings the friction member 16 into contact with the brake rotor 15, and an electric motor 11 that drives the friction member operator 13, and an electric brake control device 5 that controls the electric motor 11; a brake integrated control section 7 that generates target values for controlling each of the electric brake control devices 5; and a target value transmitter 10 that transmits the generated target values to each of the electric brake control devices 5, wherein the brake integrated control section 7 generates, as the target values, a target braking force and a target wheel speed equivalent value of each of the electric brake devices 3, and transmits the target braking force and the target wheel speed equivalent value to the target value transmitter 10, and each of the electric brake control devices 5 has a connection configuration including the following components, in other words, a braking force controller 33 that controls the electric motor 11 in accordance with the target braking force, a wheel speed controller 34 that controls the electric motor 11 in accordance with the target wheel speed equivalent value, and a control switcher 35 that switches between use of the braking force controller 33 and use of the wheel speed controller 34 in accordance with a predetermined condition.

Here, the connection configuration of each of the electric brake control devices 5 may include, for example, a configuration "each of the electric brake control devices 5 includes a wheel speed controller 34 configured to output a wheel speed command for controlling the electric motor 11 in accordance with the target wheel speed equivalent value, a braking force controller 33 configured to control the electric motor 11 in accordance with the target braking force or the wheel speed command, and a control switcher 35 configured to switch between the target braking force and the wheel speed command in accordance with a predetermined condition, and to output the target braking force or the wheel speed command to the braking force controller 33".

With this configuration, the brake integrated control section 7 generates the target braking force and the target wheel speed equivalent value of each of the electric brake devices 3, and transmits the target braking force and the target wheel speed equivalent value to the target value transmitter 10. In the electric brake control device 5, the control switcher 35 switches between use of the braking force controller 33 and use of the wheel speed controller 34 in accordance with the predetermined condition, and the braking force controller 33 controls the electric motor 11 in accordance with the target braking force. The wheel speed controller 34 controls the electric motor 11 in accordance with the target wheel speed equivalent value. As a specific example of this configuration, for example, the wheel speed controller 34 controls the electric motor 11 in accordance with the target wheel speed equivalent value, but indirectly controls the electric motor 11 by outputting the wheel speed command. The braking force controller 33 is a controller that controls the electric motor 11, but basically controls the electric motor 11 in accordance with the target braking force, or in accordance with the wheel speed command from wheel speed controller 34 in place of the target braking force. Thus, the control switcher 35 can switch between use of the braking force controller 33 and use of the wheel speed controller 34 in accordance with a predetermined condition by switching between the target braking force and the wheel speed command.

Note that the "wheel speed equivalent value" refers to a value that can be converted into the wheel speed, including, for example, a differential value and an integral value of the wheel speed, in addition to the wheel speed. The control of the wheel speed is to control the wheel speed by controlling the braking operation of the electric brake device 3, and includes a slip control or the like typified by anti-lock control as ABS and an idling prevention control as TCS (traction control system). The above-described "predetermined condition" may be designed as appropriately as will be described later. As used herein, "estimation" includes "detection" when detection is performed using a sensor.

To control the wheel speed, it is necessary to know the wheel speeds of the four wheels of a vehicle, and therefore, the wheel speed controller 34 has been conventionally provided in a host control device such as ECU. In this manner, the wheel speed controller 34, which has been hitherto provided in an ECU or the like, is provided in the electric brake control device 5 in the present invention, and receives the target wheel speed equivalent value, and a control system of the braking force control and the wheel speed control has a configuration completed in the electric brake control device 5. Accordingly, the wiring structure is simplified, thus bringing about an advantage in terms of cost. In addition, by increasing a command communication period to the electric brake control device 5, it is possible to achieve a cost reduction and enhanced reliability for the communicator More specifically, in the electric brake system, it seems that controlling each of the electric brake devices 3 by using a serial bus system, for example, typified by a CAN is the simplest and low-cost configuration. In this case, however, the communication frequency and the reliability of communication are often in the relationship of trade-off. For example, when following to brake pedal operation of a driver is considered, even when the communication period is set to be longer such as several tens of msec, it seems to be an extremely rare case that the driver can feel a delay due to such longer period. On the other hand, in wheel speed control such as anti-lock control, a time constant of the wheel speed of a following wheel having small inertia may be about 20 msec or less, then the above-described communication period is considered to be insufficient.

However, according to the present invention, the wheel speed control in anti-lock control is performed only by the electric brake control device 5, and sending commands in a network area are given for other brake controls, which do not need a high-speed operation nor normal brake control. Accordingly, it is possible to form an electric brake system that does not require an expensive communication system. At this time, as for the target wheel speed in anti-lock control, the wheel speeds of all four wheels need to be integrated, e.g. in control. However, the equivalent inertia to the target wheel speed corresponds to the weight of the vehicle body, and has a large time constant. Accordingly, it can be considered that an information transmission speed via the network area is sufficient.

In summary, the electric brake system is configured as follows.

An electric brake system that performs wheel speed control on the electric brake control device 5 is formed.

As commands to the electric brake control device 5, a braking force and a wheel speed are used.

Only parameters for which a slow communication period does not pose a problem are used as the commands to the electric brake control device 5.

Only parameters for which a low resolution does not pose a problem are used as the commands to the electric brake control device 5.

Accordingly, an electric brake system is provided for which the wiring structure can be simplified and the power line can be reduced when performing braking force control and wheel speed control such as anti-lock control, which bring about an advantage in terms of cost, and in which the command communication period to the electric brake control device can be increased, thus making it possible to achieve a reduced cost and enhanced reliability for the communicator.

As a specific configuration of the electric brake system according to the present invention, the brake integrated control section 7 may include a wheel speed instruction section 32 configured to estimate, from a wheel speed equivalent value estimated by a wheel speed estimator 9, a limit value of the wheel speed equivalent value for preventing an excessive slip state of a wheel, and use the limit value as the target wheel speed equivalent value. The control switcher 35 of the electric brake control device 5 may select control performed by the braking force controller 33 using the target braking force included in the target values if the wheel speed equivalent value estimated by the wheel speed estimator does not exceed the target wheel speed equivalent value, which is the limit value, and may select control performed by the wheel speed controller 34 using the target wheel speed equivalent value included in the target values if the wheel speed equivalent value exceeds the limit value. The excessive slip state is a locked state or the like of a wheel.

Thus, the anti-lock brake operation can be performed by selecting control performed by the braking force controller 33 using the target braking force included in the target values if the wheel speed equivalent value does not exceed a target wheel speed equivalent value that is the limit value, and selecting control performed by the wheel speed controller 34 using the target wheel speed equivalent value included in the target values if the wheel speed equivalent value exceeds the limit value.

In the electric brake system of the present invention, in place of the specific configuration, it is possible to adopt a configuration in which the brake integrated control section 7 includes a wheel speed instruction section 32 configured to estimate, from a wheel speed equivalent value estimated by a wheel speed estimator 9, a non-slip wheel speed equivalent value (i.e., a vehicle body speed equivalent value) that is a wheel speed equivalent value in synchronization with a vehicle body speed, and use the non-slip wheel speed equivalent value as the target wheel speed equivalent value, the electric brake control device 5 includes a limit value estimator 36 configured to estimate, from the wheel speed equivalent value estimated by the wheel speed estimator 9 and the non-slip wheel speed equivalent value, a limit value of a wheel speed equivalent value for preventing an excessive slip state, and the control switcher 35 selects control performed by the braking force controller 33 using the target braking force included in the target values if the wheel speed equivalent value estimated by the wheel speed estimator 9 does not exceed the limit value of the wheel speed equivalent value, and selects control performed by the wheel speed controller 34 using the target wheel speed equivalent value included in the target values if the wheel speed equivalent value exceeds the limit value.

This configuration is different from the above-described specific configuration in that the limit value estimator 36 configured to estimate the limit value of the wheel speed equivalent value is provided not in the brake integrated control section 7, but in the electric brake control device 5. Thus, anti-lock brake operation can also be performed when the limit value estimator 36 that estimates the limit value of the wheel speed equivalent value is provided on the electric brake control device 5 side.

In the electric brake system of the present invention, it is possible to adopt a configuration in which the braking force controller 33 of the electric brake control device 5 has an interpolation function of interpolating the target wheel speed equivalent value at an intermediate time in an update interval of the target wheel speed equivalent value. By providing the interpolation function in this way, the target wheel speed equivalent value can be updated and controlled even when the update interval of the target wheel speed equivalent value is increased, making it possible to perform the same control as in the case where the update interval is decreased.

In the electric brake system of the present invention, the brake integrated control section 7 may be provided in a control device provided separately from the electric brake control device 5. For example, the brake integrated control section 7 may be provided in a host ECU 6 that performs an integrated control, a cooperative control, or the like of the vehicle as a whole, or may be provided as a dedicated ECU (not shown). In the case of providing the brake integrated control section 7 in the host ECU 6, the functions of the host ECU 6 are increased, but there will be no need to separately provide a control device. In the case of providing the brake integrated control section 7 in the dedicated ECU, an increase in the complexity of the host ECU can be avoided.

In the electric brake system of the present invention, the brake integrated control section 7 may be provided in one of the electric brake control devices 5 of the plurality of electric brake devices 3. In the case of providing the brake integrated control section 7 in one of the plurality of electric brake control devices 5, the electric brake system can be completed as an electric brake system that is as independent as possible from the host ECU 6, making it possible to reduce the burden on the host ECU 6 having various functions.

In the electric brake system of the present invention, it is possible to adopt a configuration in which the target value transmitter 10 is a serial communicator configured to transmit a predetermined number of bits as one transmission frame, and each of the target braking force and the target wheel speed equivalent value is transmitted in a predetermined bit interval. In the case of this configuration, the present invention can be implemented using, for example, a CAN commonly used as an in-vehicle LAN.

In the electric brake system of the present invention, it is possible to adopt a configuration in which the target value transmitter 10 is a serial communicator configured to transmit a predetermined number of bits as one transmission frame, the transmission frame contains a target value that is one of the target braking force and the target wheel speed equivalent value, and identification information indicating which of the target braking force and the target wheel speed equivalent value the target value is, and the control switcher 35 recognizes, on the basis of the identification information, which of the target braking force and the target wheel speed equivalent value the transmitted target value is. In the case of this configuration as well, the present invention can be implemented using, for example, a CAN commonly used as an in-vehicle LAN.

The electric brake device 3 of the present invention includes an electric brake actuator 4 including a brake rotor 15, a friction member 16, a friction member operator 13 that brings the friction member 16 into contact with the brake rotor 15, and an electric motor 11 that drives the friction member operator 13; and an electric brake control device 5 that controls the electric motor 11, wherein the electric brake device includes a braking force controller 33 that controls the electric motor 11 in accordance with the target braking force, a wheel speed controller 34 that controls the electric motor 11 in accordance with the target wheel speed equivalent value, and a control switcher 35 configured to switch between use of the braking force controller 33 and use of the wheel speed controller 34 in accordance with a predetermined condition.

This configuration can be applied to the electric brake system of the present invention, and as described previously with regard to the system, the wiring structure can be simplified and the power line can be shortened when performing braking force control and wheel speed control such as anti-lock control, which bring about an advantage in terms of cost, and the command communication period to the electric brake control device 5 can be increased, thus making it possible to achieve a reduced cost and enhanced reliability for the communicator.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1A:
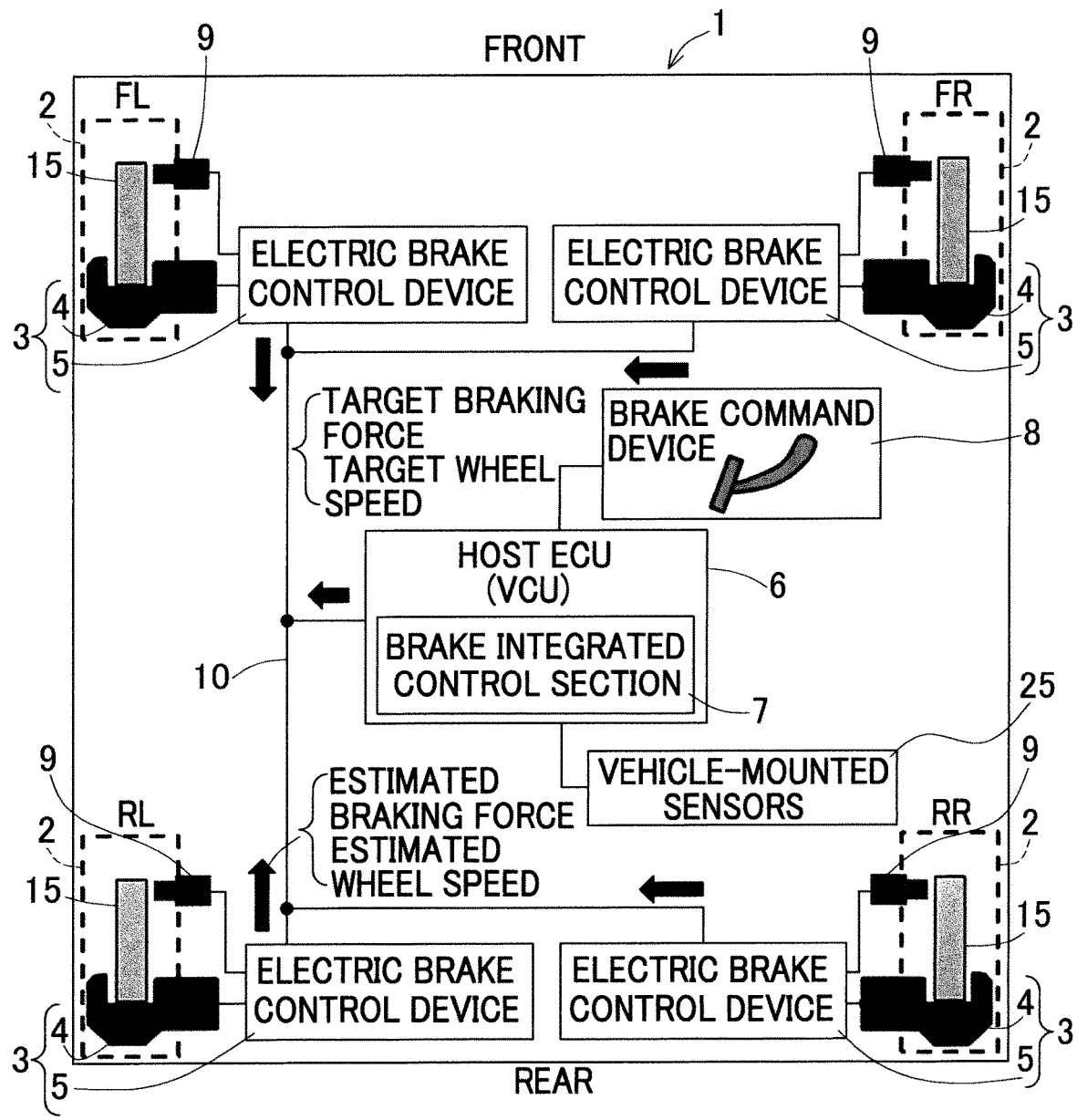
FIG. 1A is an explanatory diagram showing an example of a positional relationship between various devices of an electric brake system according to a first embodiment of the present invention.

A first embodiment of the present invention will be described with reference to the drawings. FIG. 1A shows an example in which the present invention is applied to a vehicle such as a four-wheeled automobile. In the vehicle 1, electric brake devices 3 are respectively provided to left and right wheels 2 on the front side and the rear side. Reference characters FL, FR, RL, and RR in the drawing refer to front-left, front-right, rear-left, and rear-left, respectively.

The electric brake device 3 is composed of an electric brake actuator 4 as a mechanical portion, and an electric brake control device 5 that controls the electric brake actuator 4. In this embodiment, the electric brake control device 5 is installed in the vicinity of each wheel 2, for example, in a brake caliper of the electric brake actuator 4. Each of the electric brake control devices 5 is composed of: a microcomputer including a processor; and other electronic circuits such as a ROM (Read Only Memory) including a program to be executed by the processor, a RAM (Random Access Memory), and a co-processor. In addition, for each of the wheels 2, a wheel speed estimator 9 configured to estimate the wheel speed equivalent value is installed. In this example, a wheel speed sensor that is a rotation sensor that detects a rotation speed or number of rotation per unit time (wheel speed) of wheels is used in the wheel speed estimator 9. Note that "wheel speed equivalent value" as used herein refers to a value that can be converted into a wheel speed, including, for example, a differential value and an integral value of a wheel speed, in addition to a wheel speed itself as described above.

A host ECU 6 is a device that performs integrated control and cooperative control of the vehicle 1, and is also called a "VCU (vehicle control unit)". A brake integrated control section 7 of the electric brake system is provided in the host ECU 6. The host ECU 6 is composed of: a computer including a processor; and other electronic circuits such as a ROM (Read Only Memory) including a program to be executed by the processor, a RAM (Random Access Memory), and a co-processor. To the host ECU 6, a brake command device 8 instructing a brake operation amount of a brake pedal or the like, and detection signals of the various types of sensors 25 are input. The host ECU 6 and each of the electric brake control devices 5 are connected by an in-vehicle communication network 10 such as a CAN. The in-vehicle communication network 10 is constituted by a serial bus system typified by a CAN, and forms a target value transmitter that transmits the target value generated by the brake integrated control section 7.

Figure 7:
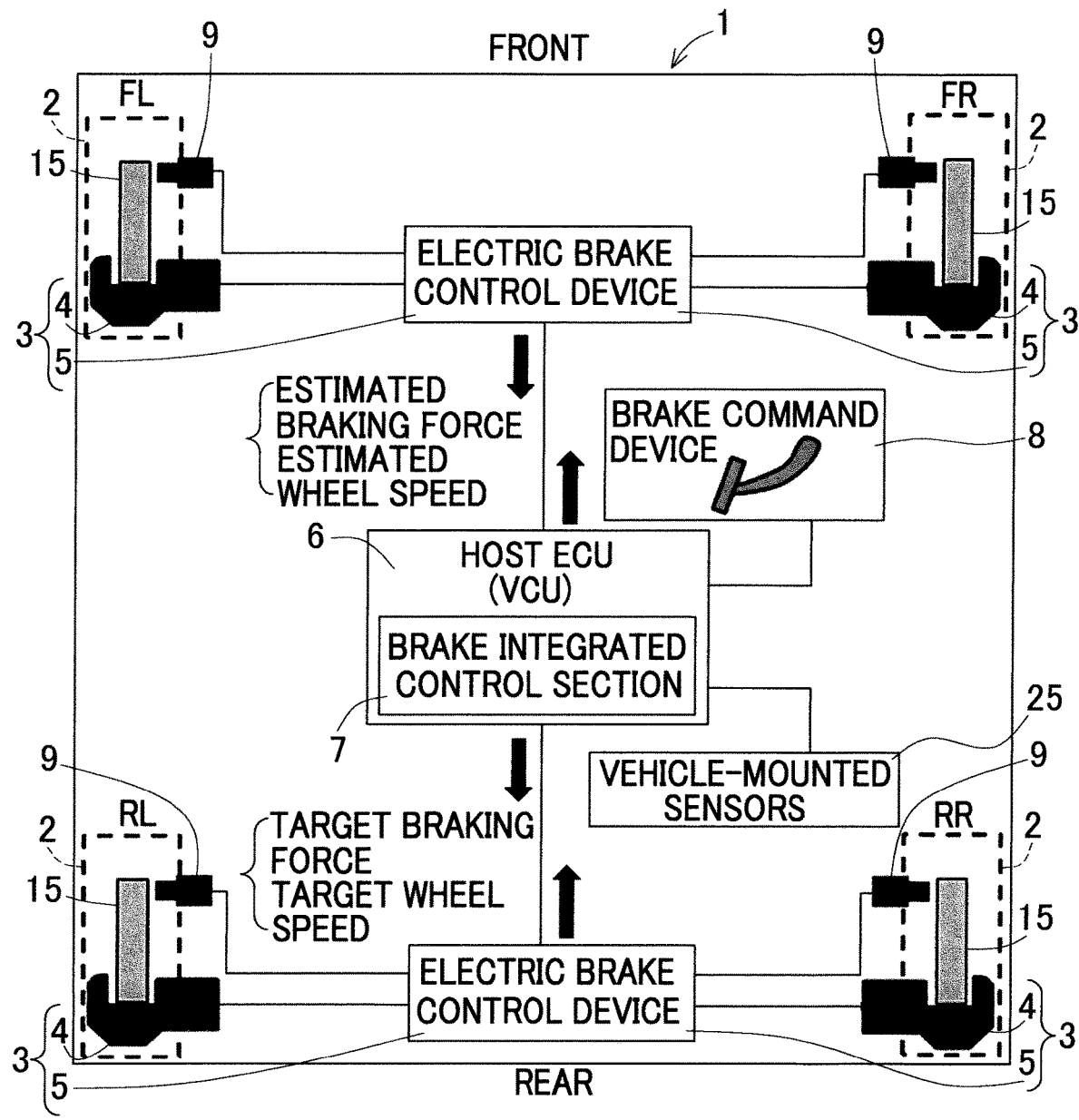
FIG. 7 is an explanatory diagram showing an example of a positional relationship between various devices of an electric brake system according to another embodiment of the present invention.

When the electric brake control device 5 is provided for each of the wheels 2 as in the example shown in the drawing, the harness has the simplest structure and is advantageous in terms of the manufacturing and mounting cost as compared with the example as shown in FIG. 7, which will be described later, and an advantage such as solid redundancy for a failure of the calculator can be achieved. By integrating the electric brake control device 5 with the brake caliper, the number of process to mount the electric brake device 3 to the vehicle 1 can be minimized, and the number of three-phase power lines, which generally give rise to a high cost and an increased weight, can be minimized.

Figure 2:
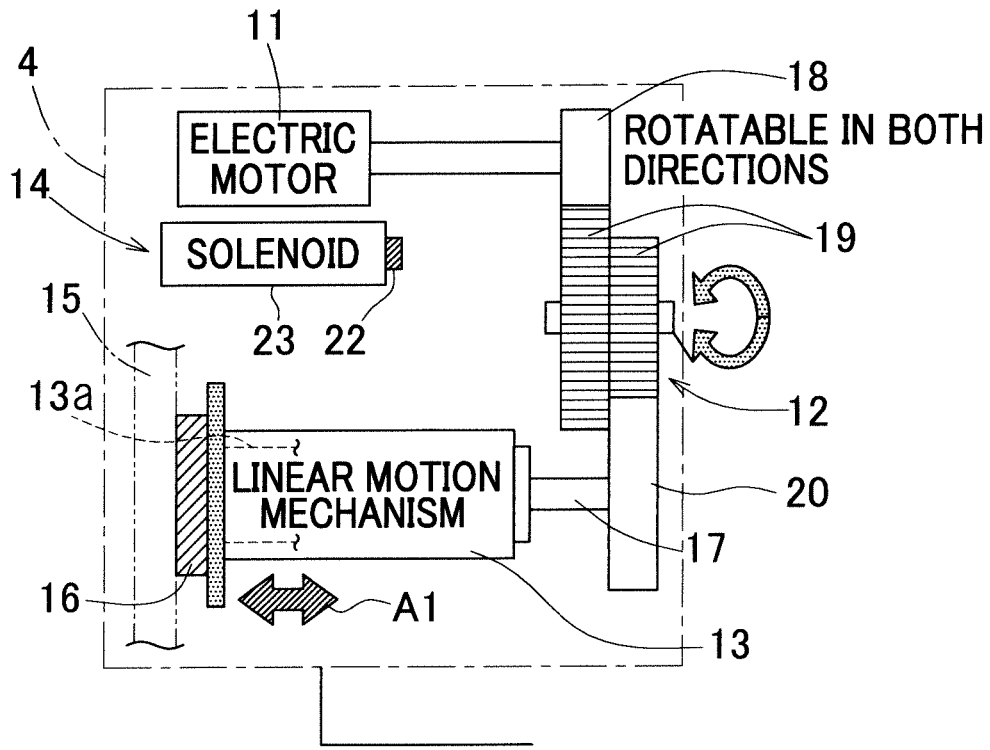
FIG. 2 is a simplified side view showing an example of an electric brake actuator applied to the electric brake system.

FIG. 2 shows an outline of a specific configuration example of the electric brake actuator 4. The electric brake actuator 4 includes an electric motor 11, a speed reduction mechanism 12 that reduces the speed of rotation of the electric motor 11, a linear motion mechanism 13 serving as a friction member operator, a parking brake mechanism 14 serving as a parking brake, a brake rotor 15, and a friction member 16. The electric motor 11, the speed reduction mechanism 12, and the linear motion mechanism 13 are incorporated into a housing (not shown) or the like, for example. Note that the brake rotor 15 may be of disk-type or drum-type. The friction member 16 is constituted by a brake pad or a brake shoe or the like. The linear motion mechanism 13 is constituted by a feed screw mechanism such as a ball screw mechanism or a planetary roller screw mechanism.

The electric motor 11 is constituted by a three-phase synchronous motor or the like. The speed reduction mechanism 12 reduces the speed of rotation of the electric motor 11 and transmits the reduced rotation to a tertiary gear 20 fixed to a rotational shaft 17, and includes a primary gear 18, an intermediate (secondary) gear 19, and the tertiary gear 20. The linear motion mechanism 13 converts the rotary motion that is output from the speed reduction mechanism 12 into linear motion of a linear motion portion 13a by using a feed screw mechanism, and brings the friction member 16 into contact with the brake rotor 15 or separates the friction member 16 from the brake rotor 15. The linear motion portion 13a is supported so as to be prevented from rotating and be movable in an axial direction indicated by an arrow A1. The friction member 16 is provided at an outboard-side (in FIG. 2, the left) end of the linear motion portion 13a. As a result of rotation of the electric motor 11 being transmitted to the linear motion mechanism 13 through the speed reduction mechanism 12, the rotary motion is converted into the linear motion, which is then converted into a pressing force of the friction member 16, thereby generating a braking force.

The parking brake mechanism 14 includes a locking member 22 and an actuator (e.g., a solenoid) 23. In an outboard-side end face of the intermediate gear 19, a plurality of locking holes (not shown) are formed at a constant interval in the circumferential direction. The locking member 22 is configured to be engageable with one of the locking holes. As the actuator 23, a linear solenoid is applied, for example. The locking member (solenoid pin) 22 is moved forward by the actuator 23 and fitted into the locking hole formed on the intermediate gear 19 so as to engage therewith, thereby preventing the intermediate gear 19 from rotating. Thus, the parking brake mechanism 14 enters a parking lock state. A part or whole of the locking member 22 is retracted into the actuator 23 to be separated from the locking hole, thereby allowing the intermediate gear 19 rotate and achieving an unlocked state.

Figure 1B:
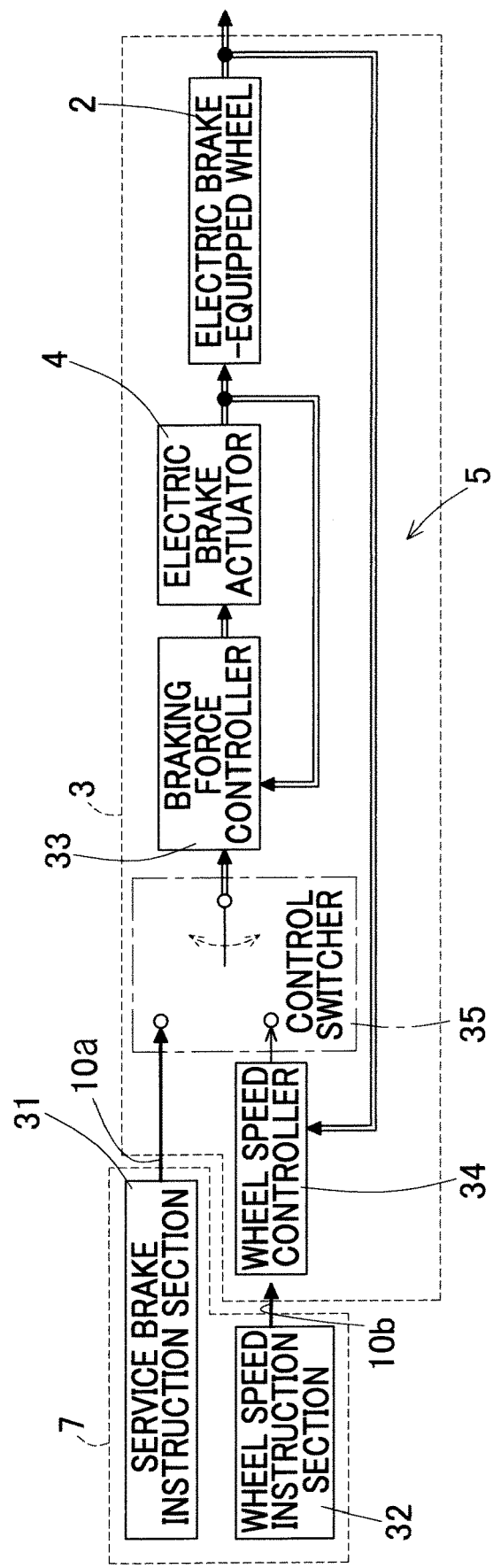
FIG. 1B is a block diagram of a conceptual configuration showing the electric brake control device and a brake integrated control section.

FIG. 1B is a block diagram showing a conceptual configuration of the brake integrated control section 7 and the electric brake control device 5. The drawing shows only those components necessary for performing a basic control. In the drawing, a connection portion that undergoes a high-speed operation and a periodical operation is indicated by the double line, and a connection portion that undergoes an a relatively lower-speed operation and a periodical operation is indicated by a single line. In addition, a portion corresponding to a communication system between the control devices is indicated by a bold line (the same also applies to the following FIGS. 10 and 11).

The brake integrated control section 7 includes a service brake instruction section 31 and a wheel speed instruction section 32. The service brake instruction section 31 is constituted by a hardware circuit or a software function on a processor (not shown) that generates a target braking force acting on each of the electric brake device 3 and distributes the target braking force to each of the electric brake devices 3, in accordance with the operation amount of a brake command device 8 (FIG. 1A) such as the brake pedal, specifically, by using a LUT (Look Up Table) implemented by software or hardware, or a predetermined transform function contained in a library of software or its hardware equivalent, etc., (hereinafter referred to as "implementation model"). The wheel speed instruction section 32 is constituted by a hardware circuit or a software function on the processor (not shown) that receives input of the above-described wheel speed or the like, and generates a target wheel speed for slip control such as anti-lock control and instructs (outputs) the target wheel speed, specifically, by using the above-described implementation model, and a comparison function or its hardware equivalent, etc. The brake integrated control section 7 transmits the above generated target braking force and target wheel speed by the target value transmitter 10 serving as the in-vehicle communication network 10.

The electric brake control device 5 includes a braking force controller 33, a wheel speed controller 34, and a control switcher 35. In accordance with the supplied target wheel speed, the wheel speed controller 34 outputs a wheel speed command for driving the electric motor 11 of the electric brake actuator 4 such that the wheel speed follows the target wheel speed. In this embodiment, the wheel speed controller 34 is provided at a higher level of the braking force controller 33, and implements control of the wheel speed by using the braking force controller 33. The braking force controller 33 drives the electric motor 11 (see FIG. 2) of the electric brake actuator 4 in accordance with the supplied target braking force or the above-described wheel speed command. The control switcher 35 determines whether the target value transmitted from the brake integrated control section 7 is the target braking force or the target wheel speed as a "predetermined condition", and switches between the target braking force and the wheel speed command in accordance with the determined type of target value, and outputs the target braking force or the wheel speed command to the braking force controller 33. Note that the "predetermined condition" may include a branch condition in step R4 or R9 in FIG. 4, which will be described later.

Specifically, the braking force controller 33 includes, for example, an inverter circuit with a semiconductor bridge capable of, using one of the target braking force or the wheel speed command that is input from control switcher 35, calculating, for example, a motor current value by using the above-described implementation model, and of outputting motor currents dependent of the calculated motor current value, and the inverter circuit drives the electric motor 11. Specifically, the wheel speed controller 34 is constituted by a hardware circuit or a software function on the processor (not shown) that receives an input of the target wheel speed, calculates the wheel speed command for driving the electric motor 11 of the electric brake actuator 4 and outputs the wheel speed command, by using the above-described implementation model such that the wheel speed follows the target wheel speed. The control switcher 35 is constituted, for example, by a switch or the like that switches between the target braking force and the wheel speed command, and the switch may be a selector or the like configured with a logic circuit.

Figure 3A:
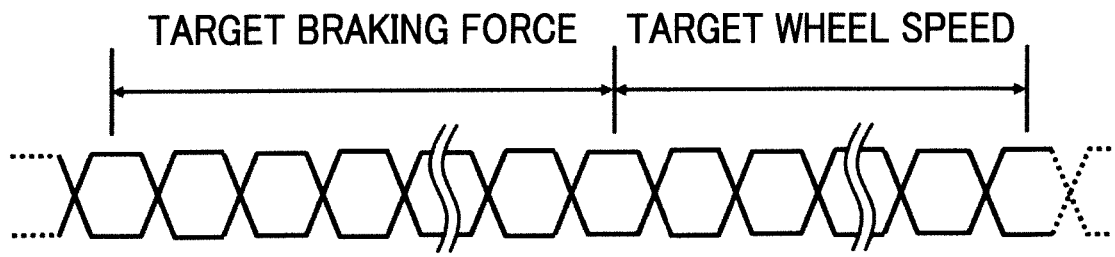
FIG. 3A is an explanatory diagram showing an example of data form of serial transmission in the electric brake system.
Figure 3B:
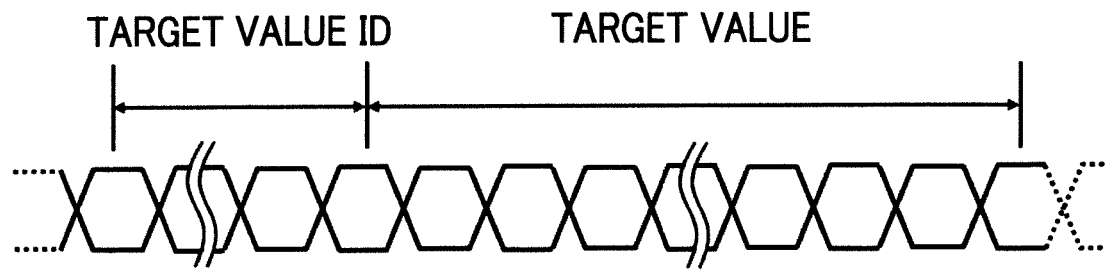
FIG. 3B is an explanatory diagram showing an example of data form of serial transmission in the electric brake system.

The in-vehicle communication network 10 serving as the target value transmitter is a serial communicator that transmits a predetermined number of bits as one transmission frame, and performs transmission in one of the forms shown in FIGS. 3A and 3B, for example. FIG. 3A shows a form in which each of the target braking force and the target wheel speed (target wheel speed equivalent value) is disposed at a predetermined bit interval in a data field included in a transmission frame, and transmitted. In FIG. 3B, a target value that is one of the target braking force and the target wheel speed (target wheel speed equivalent value) and a target value ID serving as identification information indicating which of the target braking force and the target wheel speed equivalent value the target value is are contained in the data field included in a transmission frame. Note that FIGS. 3A and 3B only show the data field, and the transmission frame contains, in addition to the data field, various fields (not shown) such as confirmation of transmission/reception and information on ID of the device that is the transmission destination.

Figure 4:
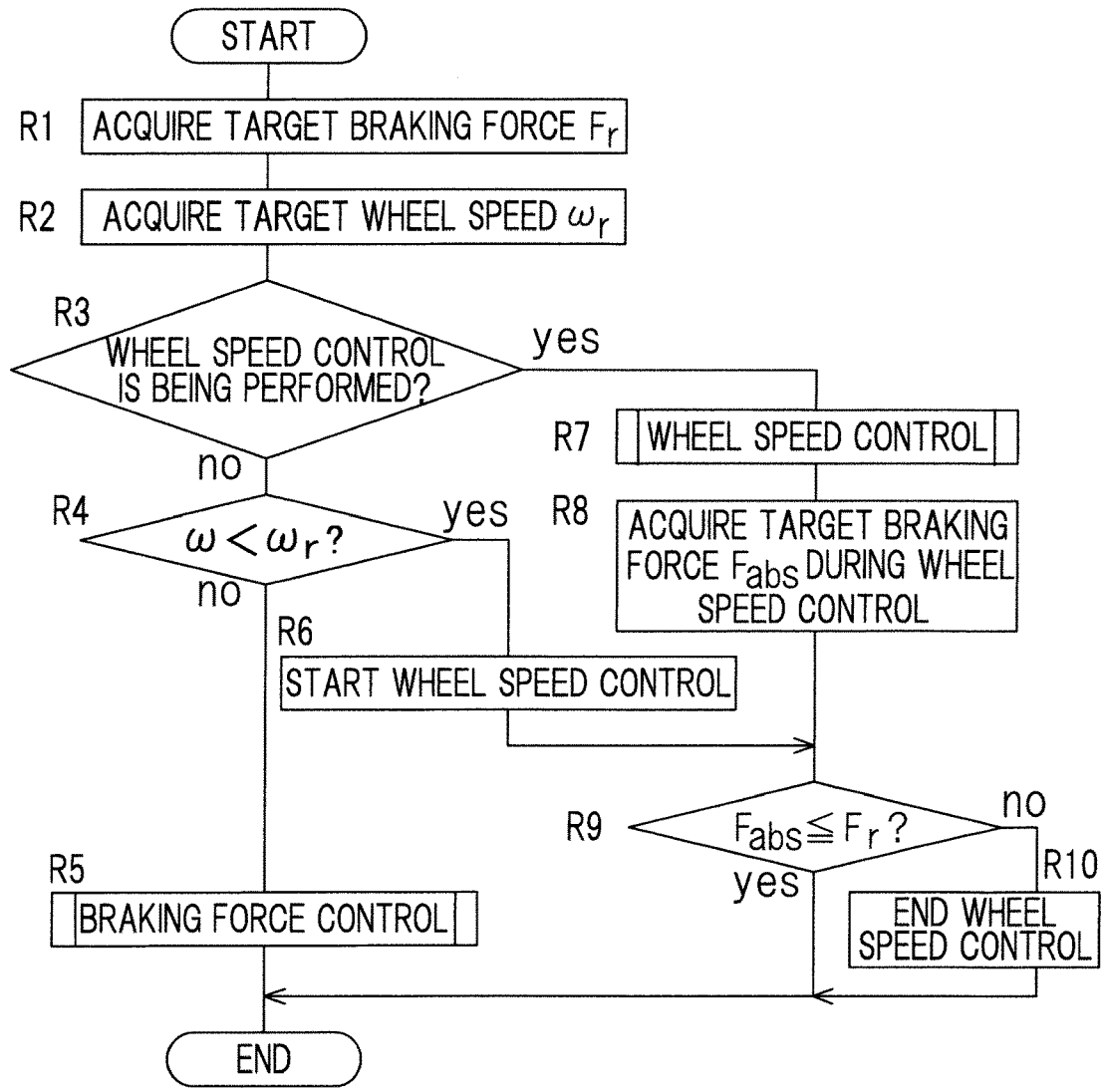
FIG. 4 is a flowchart showing an example of a control switching flow of the electric brake system.

In the case of adopting the transmission form shown in FIG. 3A, the electric brake control device 5 performs control switching shown in the flowchart of FIG. 4 by using the control switcher 35. A target braking force $F_r$ and a target wheel speed $\omega_r$ are sequentially acquired (steps R1, R2), and it is determined whether the wheel speed control is being performed (step R3). If the wheel speed control is not being performed (no in step R3), it is determined whether the wheel speed ω is less than the target wheel speed $ω_r$ (step R4). If the wheel speed ω is greater than or equal to the target wheel speed $ω_r$ (no in step R4), braking force control is performed (step R5). At the time of determination in step R4, if the wheel speed ω is less than the target wheel speed $ω_r$ (yes in step R4), wheel speed control is started (step R6).

At the time of determining whether the wheel speed control is being performed in step R3 above, if the wheel speed is being controlled (yes in step R3), then wheel speed control is continued (step R7). At this time, a target braking force $F_{abs}$ during wheel speed control is acquired (step R8). After this, or after step R6 above, it is determined whether the target braking force $F_{abs}$ during wheel speed control is less than or equal to the target braking force $F_r$ (step R9). If the target braking force $F_{abs}$ is less than or equal to the target braking force $F_r$ (yes in step R9), the process shown in the drawing ends, and the process shown in the drawing is repeated. If the target braking force $F_{abs}$ is not less than or equal to the target braking force $F_r$ (no in step R9), the wheel speed control ends (step R10).

Figure 5:
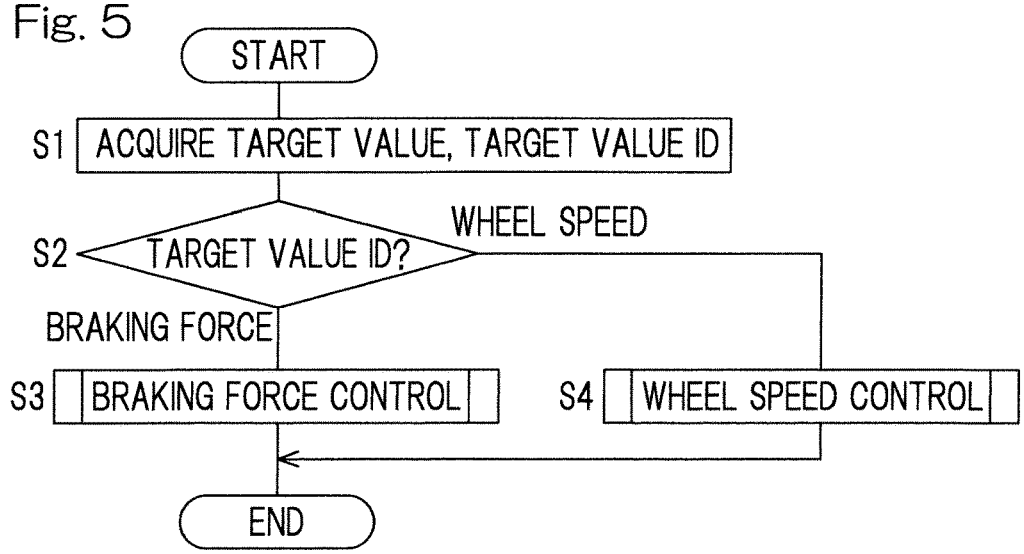
FIG. 5 is a flowchart showing another example of the control switching flow of the electric brake system.

In the case of adopting the transmission form shown in FIG. 3B, the electric brake control device 5 performs control switching shown in the flowchart of FIG. 5 by using the control switcher 35. The target value and the target value ID are acquired (step S1), it is determined whether the target value ID indicates the braking force or the wheel speed from the target value ID (step S2). The braking force control is performed if the target value ID indicates the braking force (step S3), and wheel speed control is performed if the target value ID indicates the wheel speed (step S4).

With the electric brake system having the above-described configuration, the brake integrated control section 7 generates the target braking force and the target wheel speed of each of the electric brake devices 3, and transmits the target braking force and the target wheel speed to the target value transmitter 10. In the electric brake control device 5, the braking force controller 33 controls the electric motor 11 basically in accordance with the target braking force, or in accordance with the wheel speed command instead. The wheel speed controller 34 controls the electric motor 11 indirectly via the braking force controller 33 in accordance with the target wheel speed equivalent value. In controlling the electric motor 11, the control switcher 35 substantially switches between use of the braking force controller 33 and use of the wheel speed controller 34 in accordance with the predetermined condition.

Figure 11:
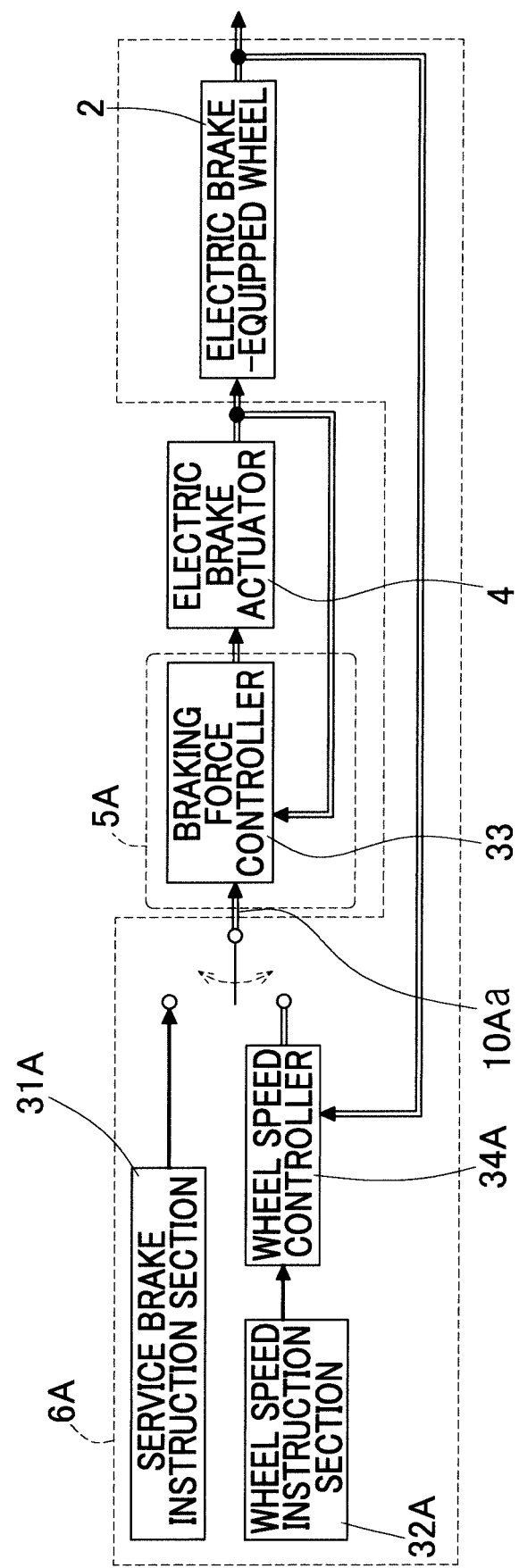
FIG. 11 is a block diagram of a conceptual configuration according to a conventional example.

To control the wheel speed, it is necessary to know the wheel speeds of the four wheels of the vehicle, and, therefore, the wheel speed controller 34A has been conventionally provided in a host ECU 6A or the like as shown in FIG. 11. In this manner, the wheel speed controller 34A, which has hitherto been provided in the host ECU 6A or the like, is provided in the electric brake control device 5 in this embodiment, and a control system of the braking force control and the wheel speed control has a configuration completed in the electric brake control device 5. Accordingly, the wiring structure is simplified, thus bringing about an advantage in terms of cost. In addition, by increasing a command communication period to the electric brake control device 5, it is possible to achieve a cost reduction and enhanced reliability for the communicator.

More specifically, in the electric brake system, it seems that controlling each of the electric brake devices 3 by using a serial bus system, for example, typified by a CAN is the simplest and low-cost configuration as the in-vehicle communication network 10. In that case, however, the communication frequency and the reliability of communication are often in the relationship of trade-off. For example, when following to brake pedal operation of a driver is considered, even when the communication period is set to be longer such as several tens of msec, it is considered to be an extremely rare case that the driver can feel a delay due to such longer period. On the other hand, in wheel speed control such as anti-lock control, a time constant of the wheel speed of a following wheel having small inertia may be about 20 msec or less, then the above-described communication period is considered to be insufficient.

However, according to this embodiment, the wheel speed control in anti-lock control is performed only by the electric brake control device 5, and sending commands in a network area are given for other brake controls, which do not need a high-speed operation nor normal brake control. Accordingly, it is possible to form an electric brake system that does not require an expensive communication system. At this time, as for the target wheel speed in anti-lock control, the wheel speeds of all four wheels need to be integrated, e.g. in control. However, the equivalent inertia to the target wheel speed corresponds to the weight of the vehicle body, and has a large time constant. Accordingly, it can be considered that an information transmission speed via the network area is sufficient. Here, by simultaneously transmitting the target wheel speed and a deceleration, the target wheel speed during the communication period can be complemented by the electric brake control device.

A further description will be given in comparison with a conventional example shown in FIG. 11. Conventionally, the wheel speed controller 34A has been provided in a host ECU 6A, and high-speed processing portions are included in the host ECU 6A, so that high-speed operation is also required in a communication system 10Aa indicated by the thick line between the host ECU 6A and the electric brake control device 5A. In contrast, according to this embodiment, as shown in FIG. 1B, all the high-speed processing portions are present in the electric brake control device 5, so that a relatively-lower-speed configuration can be allowed in the communication systems 10*a*, 10*b* (a part of the in-vehicle communication network 10) indicated by the thick line between the host ECU 6 (brake integrated control section 7) and the electric brake control device. Accordingly, it is possible to reduce the network occupancy of the brake system in the in-vehicle communication network 10 so as to achieve transmission stability, making it possible to achieve a cost reduction and enhanced reliability for the communicator.

Figure 9:
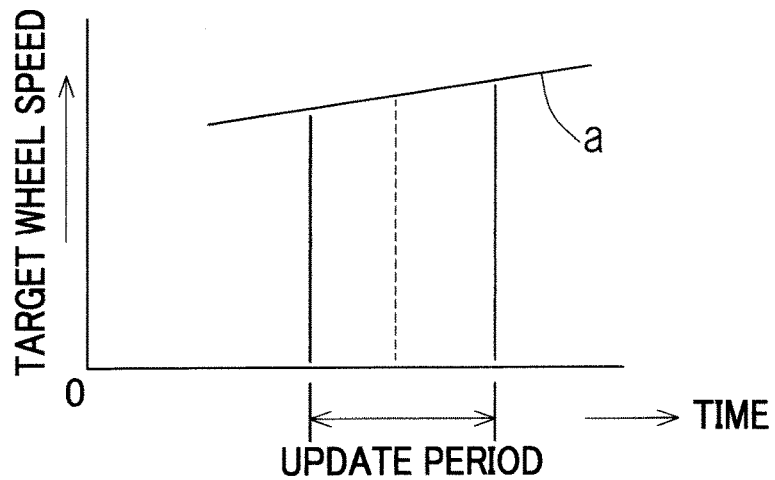
FIG. 9 is a diagram illustrating interpolation.

In this embodiment, as shown in FIG. 9, the braking force controller 33 of the electric brake control device 5 may have an interpolation function of interpolating the target wheel speed (target wheel speed equivalent value) at an intermediate time (time in the update period) in an update interval (in the drawing, the update period) of the target wheel speed. Curve α is a curve connecting the interpolated values. By providing the interpolation function in this manner, even when the update interval of the target wheel speed is increased, the target wheel speed equivalent value can be updated and controlled, making it possible to perform the same control as in the case where the update interval is shortened. The foregoing is not limited to the target wheel speed, and also applies a case where the target wheel speed equivalent value other than the target wheel speed is used.

Next, a more specific example of the anti-lock control according to this embodiment will be described. In this specific example, the wheel speed instruction section 32 of the brake integrated control section 7 estimates, from the wheel speed equivalent value estimated by the wheel speed estimator 9 of a wheel 2, a limit value of the wheel speed equivalent value for preventing an excessive slip state of the wheel 2, and uses the limit value as the target wheel speed (target wheel speed equivalent value). The control switcher 35 of the electric brake control device 5 is configured to select control performed by the braking force controller 33 using the target braking force included in the target values if the wheel speed equivalent value estimated by the wheel speed estimator 9 does not exceed the target wheel speed equivalent value, and select control performed by the wheel speed controller 34 using the target wheel speed equivalent value included in the target values if the wheel speed equivalent value exceeds the target wheel speed (target wheel speed equivalent value) (this configuration also includes, for example, a configuration in which an indirect control via the braking force controller 33 is performed by the wheel speed controller 34; the same applies to the following). The excessive slip state is a locked state or the like of a wheel.

Figure 6:
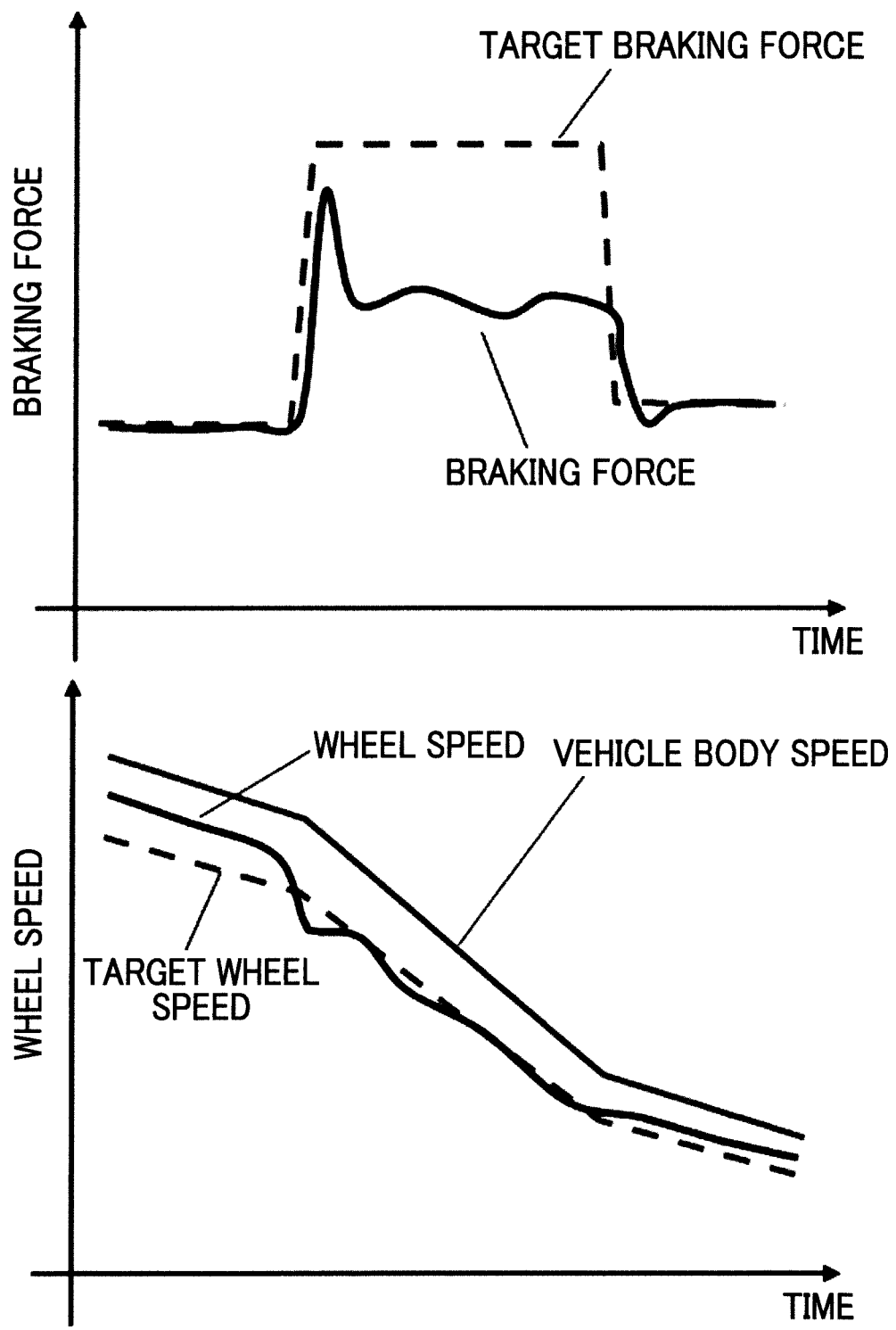
FIG. 6 is an explanatory diagram showing an example of a control switching operation performed by the electric brake system.

Thus, the anti-lock brake operation can be performed by selecting control performed by the braking force controller 33 using the target braking force included in the target values if the wheel speed equivalent value does not exceed the target wheel speed equivalent value, and selecting control performed by the wheel speed controller 34 using the target wheel speed equivalent value included in the target values if the wheel speed equivalent value exceeds the limit value. FIG. 6 shows the switching of control.

Figure 10:
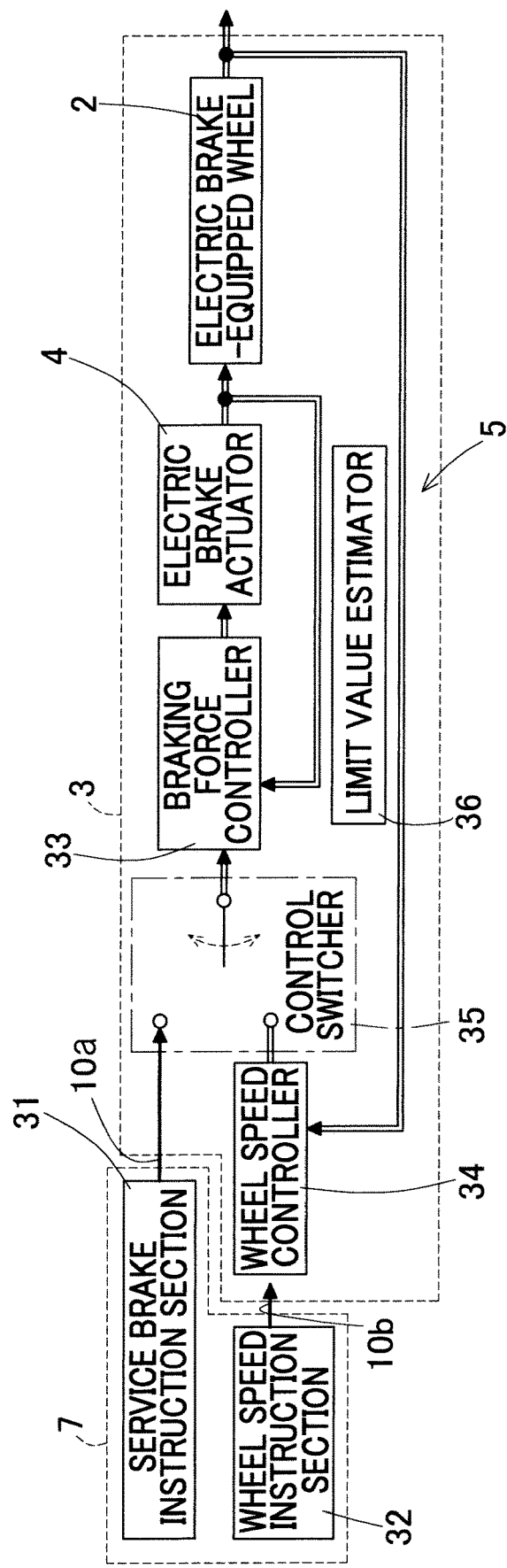
FIG. 10 is a block diagram of a conceptual configuration showing another electric brake control device and a brake integrated control section in the electric brake system according to the first embodiment of the present invention.

Another specific example of the anti-lock control will be described with reference to FIG. 10. In another specific example, the brake integrated control section 7 of the wheel speed instruction section 32 estimates, from the wheel speed equivalent value estimated by the wheel speed estimator 9, a non-slip wheel speed equivalent value (i.e., a vehicle body speed equivalent value) that is a wheel speed equivalent value in synchronization with the vehicle body speed, and uses the non-slip wheel speed equivalent value as the target wheel speed equivalent value. The electric brake control device 5 includes a limit value estimator 36 configured to estimate, from the wheel speed equivalent value estimated by the wheel speed estimator 9 and the non-slip wheel speed equivalent value, a limit value of a wheel speed equivalent value for preventing an excessive slip state. The control switcher 35 selects control performed by the braking force controller 33 using the target braking force included in the target values if the wheel speed equivalent value estimated by the wheel speed estimator 9 does not exceed limit value of the wheel speed equivalent value, and selects control performed by the wheel speed controller 34 using the target wheel speed equivalent value included in the target values if the wheel speed equivalent value exceeds the limit value.

This configuration is different from the previously described specific example in that the limit value estimator 36 that estimates a limit value of the wheel speed equivalent value is provided not in the brake integrated control section 7, but in the electric brake control device 5. Thus, the anti-lock brake operation can also be performed when the limit value estimator 36 that estimates a limit value of the wheel speed equivalent value is provided on the electric brake control device 5 side.

FIG. 7 shows another embodiment of the present invention. This embodiment shows an example in which one electric brake control device 5 is provided for electric brake actuators 3, 3 provided for left and right wheels 2 in each of the front and the rear of the vehicle 1. That is, the electric brake control device 5 serves as a control device for both the two left and right electric brake control devices 5, 5. In the case of this embodiment, the number of harnesses is increased as compared with the first embodiment shown in FIG. 1A. However, there is an advantage of a reduced number of the electric brake control devices 5. The other components and the effect are the same as those of the first embodiment.

Figure 8:
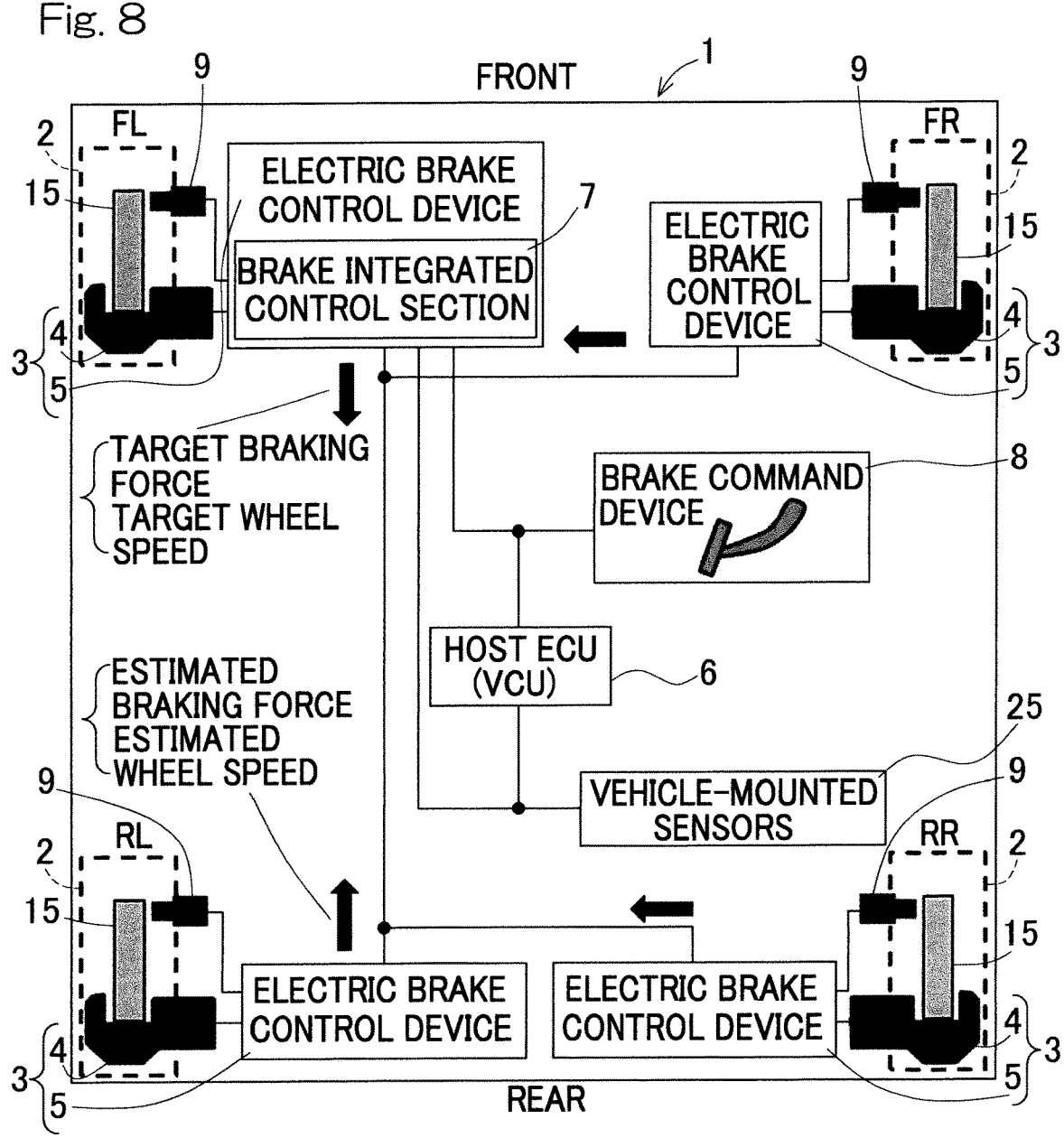
FIG. 8 is an explanatory diagram showing an example of a positional relationship between various devices of an electric brake system according to a still another embodiment of the present invention.

FIG. 8 shows still another embodiment of the present invention. In this embodiment, the brake integrated control section 7 is installed in one of the electric brake control devices 5 of the electric brake devices 3 of the wheels 2. In the case of this embodiment, the electric brake system can be completed as an electric brake system as independent as possible from the host ECU 6, making it possible to reduce the burden on the host ECU 6 having various functions. The other components and the effect are the same as those of the first embodiment.

Although the present invention has been described above in connection with the preferred embodiments thereof with reference to the accompanying drawings, the embodiments disclosed herein are to be construed in all respects as illustrative and not limiting. The scope of the present invention is defined by the claims, rather than the above description. Those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . vehicle
2 . . . wheel
3 . . . electric brake device
4 . . . electric brake actuator
5 . . . electric brake control device
6 . . . host ECU
7 . . . brake integrated control section
8 . . . brake command device
9 . . . wheel speed estimator
10 . . . in-vehicle communication network (target value transmitter)
11 . . . electric motor
13 . . . linear motion mechanism (friction member operator)
15 . . . brake rotor
16 . . . friction member
31 . . . service brake instruction section
32 . . . wheel speed instruction section
33 . . . braking force controller
34 . . . wheel speed controller
35 . . . control switcher
36 . . . limit value estimator

What is claimed is:

1. An electric brake system comprising:
a plurality of electric brake devices each including an electric brake actuator that includes a brake rotor, a friction member, a friction member operator configured to bring the friction member into contact with the brake rotor, and an electric motor configured to drive the friction member operator, and an electric brake control device configured to control the electric motor;
a brake integrated control section configured to generate target values for controlling each of the electric brake control devices; and a target value transmitter configured to transmit the generated target values to each of the electric brake control devices, wherein the brake integrated control section generates, as the target values, a target braking force and a target wheel speed equivalent value of each of the electric brake devices, and transmits the target braking force and the target wheel speed equivalent value to the target value transmitter, each of the electric brake control devices includes a braking force controller configured to control the electric motor in accordance with the target braking force, a wheel speed controller configured to control the electric motor in accordance with the target wheel speed equivalent value, and a control switcher configured to switch between use of the braking force controller and use of the wheel speed controller in accordance with a predetermined condition, the brake integrated control section includes a wheel speed instruction section configured to estimate, from a wheel speed equivalent value estimated by a wheel speed estimator, a limit value of the wheel speed equivalent value for preventing an excessive slip state of a wheel, and use the limit value as the target wheel speed equivalent value, and the control switcher of the electric brake control device selects control performed by the braking force controller using the target braking force included in the target values if the wheel speed equivalent value estimated by the wheel speed estimator does not exceed the target wheel speed equivalent value, and selects control performed by the wheel speed controller using the target wheel speed equivalent value included in the target values if the wheel speed equivalent value exceeds the target wheel speed equivalent value.

2. An electric brake system comprising:

a plurality of electric brake devices each including an electric brake actuator that includes a brake rotor, a friction member, a friction member operator configured to bring the friction member into contact with the brake rotor, and an electric motor configured to drive the friction member operator, and an electric brake control device configured to control the electric motor;

a brake integrated control section configured to generate target values for controlling each of the electric brake control devices; and a target value transmitter configured to transmit the generated target values to each of the electric brake control devices, wherein the brake integrated control section generates, as the target values, a target braking force and a target wheel speed equivalent value of each of the electric brake devices, and transmits the target braking force and the target wheel speed equivalent value to the target value transmitter, each of the electric brake control devices includes a braking force controller configured to control the electric motor in accordance with the target braking force, a wheel speed controller configured to control the electric motor in accordance with the target wheel speed equivalent value, and a control switcher configured to switch between use of the braking force controller and use of the wheel speed controller in accordance with a predetermined condition, the brake integrated control section includes a wheel speed instruction section configured to estimate, from a wheel speed equivalent value estimated by a wheel speed estimator, a non-slip wheel speed equivalent value that is a wheel speed equivalent value in synchronization with a vehicle body speed, and use the non-slip wheel speed equivalent value as the target wheel speed equivalent value, the electric brake control device includes a limit value estimator configured to estimate, from the wheel speed equivalent value estimated by the wheel speed estimator and the non-slip wheel speed equivalent value, a limit value of a wheel speed equivalent value for preventing an excessive slip state, and the control switcher selects control performed by the braking force controller using the target braking force included in the target values if the wheel speed equivalent value estimated by the wheel speed estimator does not exceed the limit value of the wheel speed equivalent value, and selects control performed by the wheel speed controller using the target wheel speed equivalent value included in the target values if the wheel speed equivalent value exceeds the limit value.

3. The electric brake system as claimed in claim 1, wherein
the braking force controller of the electric brake control device has an interpolation function of interpolating the target wheel speed equivalent value at an intermediate time in an update interval of the target wheel speed equivalent value.

4. The electric brake system as claimed in claim 1, wherein
the brake integrated control section is provided in a control device provided separately from the electric brake control device.

5. The electric brake system as claimed in claim 1, wherein
the brake integrated control section is provided in one of the electric brake control devices of the plurality of electric brake devices.

6. The electric brake system as claimed in claim 1, wherein
the target value transmitter is a serial communicator configured to transmit a predetermined number of bits as one transmission frame, and each of the target braking force and the target wheel speed equivalent value is transmitted in a predetermined bit interval.

7. The electric brake system as claimed in claim 1, wherein
the target value transmitter is a serial communicator configured to transmit a predetermined number of bits as one transmission frame,
the transmission frame contains: a target value that is one of the target braking force and the target wheel speed equivalent value; and identification information indicating which of the target braking force and the target wheel speed equivalent value the target value is, and
the control switcher recognizes, on the basis of the identification information, which of the target braking force and the target wheel speed equivalent value the transmitted target value is.

8. An electric brake device comprising:
an electric brake actuator including a brake rotor, a friction member, a friction member operator configured to bring the friction member into contact with the brake rotor, and an electric motor configured to drive the friction member operator; and
an electric brake control device configured to control the electric motor, wherein the electric brake device includes a braking force controller configured to control the electric motor in accordance with the target braking force, a wheel speed controller configured to control the electric motor in accordance with a target wheel speed equivalent value, and a control switcher configured to switch between use of the braking force controller and use of the wheel speed controller in accordance with a predetermined condition, and the control switcher is configured to select control performed by the braking force controller using the target braking force included in the target values if a wheel speed equivalent value estimated by a wheel speed estimator does not exceed the target wheel speed equivalent value, and select control performed by the wheel speed controller using the target wheel speed equivalent value included in the target values if the wheel speed equivalent value exceeds the target wheel speed equivalent value, the target wheel speed equivalent value being a limit value of the wheel speed equivalent value for preventing an excessive slip state of a wheel.

\* \* \* \* \*